July 8, 1958

H. F. WALLACE 2,841,847

LANDING NET HOLDER

Filed May 5, 1955

Inventor
Harry F. Wallace
By Shoemaker & Mattare
ATTYS

United States Patent Office 2,841,847
Patented July 8, 1958

2,841,847

LANDING NET HOLDER

Harry F. Wallace, Bethlehem, Pa.

Application May 5, 1955, Serial No. 506,155

6 Claims. (Cl. 24—3)

This invention relates to improvements in holders for fishermen's landing nets.

A crucial moment is encountered in fishing when the fish have been played to within a close enough range to the fisherman wherein the fish can be landed inasmuch as at that time the fishing line is under considerable strain and it is all important that the fisherman be enabled to quickly grasp the landing net with one hand while maintaining control of the fishing rod with the other so as to complete the landing operation. Of course, the fisherman will have only one hand free to grasp the net and it, therefore, must either be within easy reach upon a convenient rock or the like or it must be so attached to the wearer's body in some manner as to easily permit its disconnection therefrom. The latter course of action is, of course, more desirable inasmuch as it permits the fisherman a great deal of freedom in action during the playing of the fish after it is hooked and permits him to move around from place to place which will most advantageously effect the final landing operation. It is, therefore, a primary object of this invention to provide an improved means for attaching a landing net to a piece of wearing apparel whereby the landing net may be very easily and quickly disconnected therefrom when needed.

Another object of this invention is to provide an improved form of holder for landing nets which will permit securement thereof to a garment, such as a coat or the like, and which is of simple and economical manufacture and yet which is fully effective to permit the landing net to be easily and quickly disconnected from the garment.

A further object of this invention is to provide an improved landing net holder which incorporates an elongate body member having a first longitudinal bore therein which is closed at one end and open at the other end and which has disposed therein spring means so that when the stem portion of a separate member attached to a landing net handle is inserted within the longitudinal bore the spring means will be compressed and wherein there are secondary bores in the body which are medially convergent and intersect with each other and with the longitudinal bore at a point adjacent the open end of the latter, which secondary bores receive ball members engageable within an annular groove in the stem such that the stem will be locked in position against the compression of the spring means to secure the body and stem together and wherein there are means provided for attaching the body to the wearing apparel of the user.

Still another object of this invention is to provide an improved form of landing net holder which is swivelly mounted upon a garment to permit the same to be moved between a normal and an inverted position to rapidly and easily effect disconnection of component parts thereof whereby to make readily accessible for use a landing net connected to one of the component parts.

A further object of this invention is to provide an improved landing net holder embodying an elongate body member having three bores therein all intersecting at a common point adjacent one end of the body, there being ball members disposed in two of the bores which are movable by gravity between locking and unlocking positions by virtue of the body member being adapted for pivotal or swivel mounting to an associated garment.

Still another object of this invention is to provide an improved landing net holder which includes an elongate body having a longitudinal bore therein which is open at one end and closed at the other end and which receives therein a spring member and a plunger associated therewith and wherein the holder assembly includes a fastening member which is secured at one end to the holder of the landing net and which has at its other end a stem which is projected within the bore to engage the plunger and compress the spring and wherein there are secondary convergent bores intersecting each other and the first bore at a point adjacent the open end of the latter which are engageable within an annular groove in the stem to hold the same within the body member against the compression of the spring, the body member being so mounted to an associated garment that it is movable to a position wherein the secondary bores are disposed in an upwardly convergent position to permit the balls to fall by gravity in engagement within the annular groove in the stem when such stem is depressed slightly against the action of the spring.

Another object of this invention is to provide an improved landing net holder consisting of a locking portion and a separable fastening portion, the fastening portion being secured to a landing net handle and the locking portion being secured swivelly to an associated garment, and the locking portion including a body having a bore therein receiving a spring member and a plunger in which that end of the plunger which engages the spring is enlarged and wherein there are secondary bores within the body intersecting each other and the first bore adjacent the open end of the latter which receive ball members engageable with the fastening member to connect two parts detachably together.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

Figure 1:
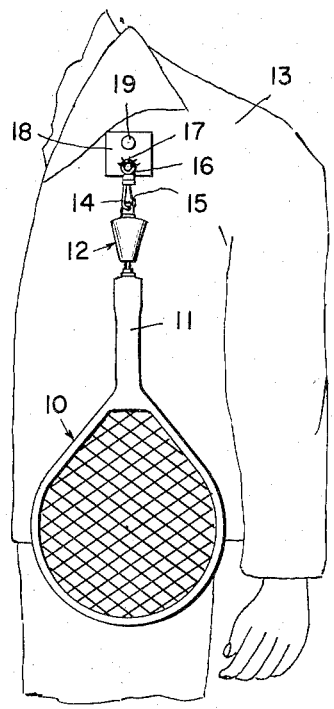
Fig. 1 is an elevational view showing the normal position of a landing net as attached to an associated garment by means of the instant invention.

Referring now more particularly to the drawing, the reference numeral 10 indicates a landing net generally which may be of any conventional construction and which includes the handle portion 11 which is attached by means of the holder assembly indicated generally by the reference character 12 to the wearing apparel 13 which in this case may be a jacket or coat, the connection between the holder 12 being effected by means of the snap hook member 14 which may include a spring locking element 15 and a swivel eye 16, which eye is stitched as at 17 to a patch of material 18 having a small snap fastener element 19 engaged thereon cooperable with a stud member, not shown, which is attached to the garment 13 and by means of which the patch 18 may be swivelled on the garment 13. Of course, it is to be understood that any suitable means may be provided for securing the holder assembly 12 to the garment 13, it being necessary only that such securing means include mechanism permitting the landing net 10 to be pivoted or swivelled from the position shown in Fig. 1 to a position wherein the landing net is inverted or swung about substantially 180°.

Figure 2:
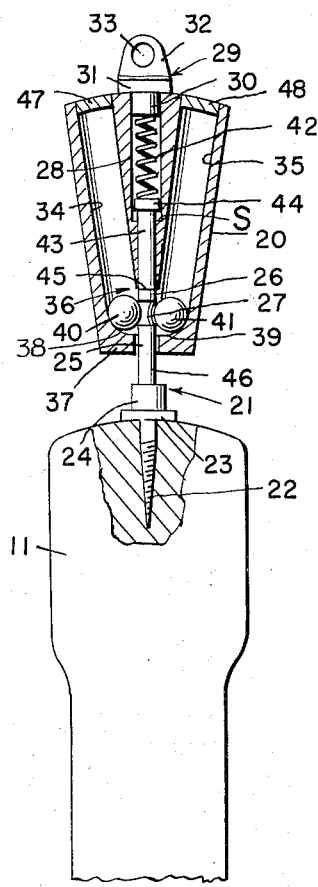
Fig. 2 is an enlarged sectional view taken through the holder device showing the parts thereof in operative engagement to support an associated landing net handle.

Referring now more particularly to Fig. 2, the holder assembly will be seen to consist essentially of two separable component parts, namely, the elongate body member 20 and the fastening element or member which is indicated generally by the reference character 21. The fastening member has a tapered screw threaded portion 22 on one end which is adapted to be engaged with the handle 11 in the manner shown. The intermediate portion of the fastening member 21 has provided thereon an abutment collar 23 and an adjacent enlarged portion 24 which may be provided for the purpose of permitting a pair of pliers or the like to be engaged with the fastening element for the purpose of securing it to the handle 11. The opposite end of the fastening element 21 consists of the elongate stem portion 25 which has adjacent to its tip end 26 an annular groove 27.

The elongate body 20 has a longitudinal bore 28 therethrough which is counterbored to provide the shoulder S and is closed at the normally upper end thereof by the plug element indicated generally by the reference character 29, which plug element has a reduced end portion 30 snugly received within the bore 28 and the plug member has an enlarged external head portion 31 which bears against the outer surface of the body member and the plug member also includes the upstanding projection 32 which is apertured as at 33 so that the holder assembly may be conveniently attached pivotally to an associated garment as by the previously described snap hook 14.

Disposed on opposite sides of the longitudinal bore 28 are a pair of secondary convergent bores 34 and 35, which bores intersect in the area indicated generally by the reference character 36 not only with each other but with the longitudinal bore 28. The secondary bores 34 and 35 also terminate short of the normally lower end 37 of the body 20 and are preferably provided thereat with the slightly inclined bottom portions 38 and 39 to provide the wedging action which will be presently described. The balls 40 and 41 are disposed in the respective bores 34 and 35 and are freely engaged therein.

Disposed within the bore 28 in abutting relation to the reduced portion 30 of the plug member 29 is a compression spring 42 and engaged against the opposite end of this compression spring and also disposed within the bore 28 is a plunger which includes the shank portion 43 and the enlarged head 44, the latter of which is engaged against the compression spring 42 in the manner shown. The overall length of the spring 42 and the plunger assembly is such that the lower end 45 of the plunger shank is engaged by the tip 26 of the stem 25 to compress the spring 42 somewhat when the annular groove 27 of the fastening member 21 is located within the area 36, at which point the several bores intersect and in this position with the body member 20 disposed in the position shown in Fig. 2 it will be apparent that the balls 40 and 41 will be received within the annular groove 27 to retain the stem 25 in the position shown in Fig. 2 against the compression of the spring 42. Of course, to permit the balls 40 and 41 to drop down far enough to engage within the annular groove 27, when inserting the stem 25 into the longitudinal bore 28, the stem must be projected a greater distance than that shown in Fig. 2 and after the ball members have dropped down past the tip 26 of the stem and into the groove 27, when the upward pressure on the stem 25 is released, the parts will assume the position shown in Fig. 2 and the landing net 10 will be securely suspended from the garment 13.

Figure 3:
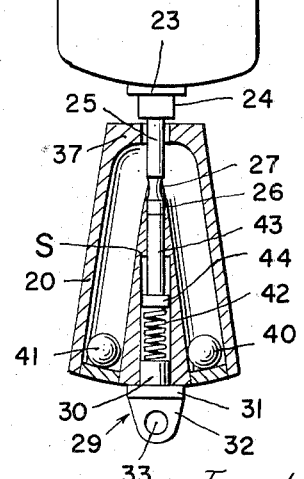
Fig. 3 is a view similar to Fig. 2 but showing the body member in an inverted position and illustrating the manner in which the landing net handle is depressed to release the balls and permit disengagement of the stem from the body member.
Figure 4:
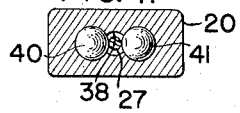
Fig. 4 is a transverse section through the lower end of the body in the region of the intersection of the various bores.

Now when it is desired to release the landing net it is merely necessary to pivot or swivel the same such that the holder assembly and the landing net handle assume the position shown in Fig. 3 wherein the normally lowermost end 37 of the body member 20 is disposed uppermost. Of course, the fisherman effects this manipulation by grasping the handle 11 of the landing net and when this position is attained manual depression of the landing net handle 11 and consequently the stem 25 will permit the ball members 40 and 41 to fall by gravity to the position shown in Fig. 3 and thereby release their grip upon the annular groove 27 of the stem 25, whereby an upward pull on the landing net handle 11 will completely release the same from the holder body 20.

When the parts are locked as in the position shown in Fig. 2, it will be apparent that there is a downward force exerted by the compression spring upon the stem 25 and since the bores 34 and 35 are mutually convergent and the diameters of the balls 40 and 41 are such as to cause portions of their surfaces to be projected into the annular groove 27, the stem 25 cannot be withdrawn until the above described manipulations in connection with Fig. 3 are accomplished. The inclined bottom portions 38 and 39 of the convergent bores 34 and 35 assure that the downward pressure created by the spring 48 and the stem 25 and consequently on the balls 40 and 41 will permit the balls to be forced into tight engagement within the annular groove 27 and it will be evident that when the balls are thus locked with the stem 25, it becomes impossible to withdraw the stem from the body 20 by mere downward pressure and, in fact, the locking action due to the formation of the bottom surfaces 38 and 39 becomes greater as the downward pressure is increased.

It is preferred that the enlarged head 44 of the plunger member be substantially snugly received within the longitudinal bore 28 so that the plunger is guided properly therein and, of course, withdrawal of the plunger is prevented by shoulder S.

The normally uppermost ends of the convergent bores 34 and 35 are, of course, closed by suitable plug elements 47 and 48 respectively to retain the balls 40 and 41 within such bores.

I claim:

1. A landing net holder comprising an elongate body having a longitudinal bore opening upon one end thereof, the bore being closed at the opposite end of the body, spring means disposed within said bore and seating upon the closed end thereof, an elongate fastening member having means thereon adapting it for attachment to a landing net and a stem projected within the open end of said bore and compressing said spring means, said body also having a pair of convergent secondary bores intersecting each other and the first mentioned bore in an area adjacent the stated open end of the first bore, a loose ball disposed in each of the secondary bores and each ball being freely movable in its bore, and said stem having an annular groove therein receiving portions of said balls to retain said stem in the first bore against the action of said spring means.

2. A landing net holder comprising an elongate body having a longitudinal bore opening upon one end thereof, the bore being closed at the opposite end of the body, a spring disposed within said bore and bearing against the closed end thereof, a plunger received in said bore and engaged against said spring, an elongate fastening member having one end formed with screw threads for attachment to a landing net handle and having a stem on its opposite end, said stem being projected within the open end of said bore and bearing against said plunger to compress the spring, said body having a pair of convergent secondary bores intersecting each other and the first mentioned bore in an area adjacent the stated open end of the first bore, a loose ball disposed in each of the secondary bores and each ball being freely movable in its bore, and said stem having an annular groove therein receiving portions of said balls to retain said stem in the first bore against the compression of said spring.

3. A landing net holder comprising an elongate body having a longitudinal bore therethrough and a pair of secondary convergent bores intersecting each other and the first mentioned bore at a point adjacent one end of the first bore, a plug member fitted in the opposite end of the first bore and having an apertured projection thereon for swivelly mounting the body on a garment, spring means disposed within the first bore, a fastening member having means on one end for attachment to a landing net handle and having a stem on its opposite end, said stem being projected within the open end of said first bore and compressing said spring means, a loose ball disposed within each of said secondary bores and each ball being freely movable in its bore, and said stem having an annular groove therein receiving portions of said balls to retain said stem within the first bore against the action of said spring means.

4. A landing net holder comprising a locking unit adapted to be swivelly attached to an associated garment and a fastening member attached to a landing net and detachably engaged with said locking unit, said locking unit including an elongate body having a longitudinal bore therein closed at one end and spring means within the bore, and having a pair of secondary bores intersecting each other and the first bore in an area adjacent the open end of the latter, and there being a ball freely disposed in each secondary bore, said fastening member including an elongate stem projected within the open end of said first bore and compressing said spring means, and there being an annular groove adjacent the free end of said stem receiving portions of said balls to retain the stem within said first bore against the action of said spring means, said spring means including a compression spring and a plunger engaged therewith, said plunger having an enlarged head engageable with a shoulder in said longitudinal bore to prevent escape of the plunger when said stem is removed.

5. A landing net holder comprising a locking unit adapted to be swivelly attached to an associated garment and a fastening member attached to a landing net and detachably engaged with said locking unit, said locking unit including an elongate body having a longitudinal bore therein closed at one end and spring means within the bore, and having a pair of secondary bores intersecting each other and the first bore in an area adjacent the open end of the latter, and there being a ball freely disposed in each secondary bore, said fastening member including an elongate stem projected within the open end of said first bore and compressing said spring means, and there being an annular groove adjacent the free end of said stem receiving portions of said balls to retain the stem within said first bore against the action of said spring means, said secondary bores having inclined bottom surfaces to abruptly wedge said balls within the annular groove in said stem.

6. A landing net holder comprising a locking unit adapted to be swivelly attached to an associated garment and a fastening member attached to a landing net and detachably engaged with said locking unit, said locking unit including an elongate body having a longitudinal bore therein closed at one end and having a shoulder portion adjacent its other end and spring means within the bore, and having a pair of secondary bores intersecting each other and the first bore in an area adjacent the open end of the latter, and there being a ball freely disposed in each secondary bore, said fastening member including an elongate stem projected within the open end of said first bore and compressing said spring means, and there being an annular groove adjacent the free end of said stem receiving portions of said balls to retain the stem within said first bore against the action of said spring means, said spring means including a compression spring and a plunger engaged therewith, said plunger having an enlarged head engageable with said shoulder portion to prevent escape of the plunger when said stem is removed, said secondary bores having inclined bottom surfaces to abruptly wedge said balls within the annular groove in said stem.

References Cited in the file of this patent

UNITED STATES PATENTS

| | | |
|---|---|---|
| 1,264,993 | Strohacker | May 7, 1918 |
| 1,471,570 | Peterson | Oct. 23, 1923 |
| 2,123,935 | Dole | July 19, 1938 |
| 2,188,950 | Jordan | Feb. 6, 1940 |
| 2,435,444 | Johnsen | Feb. 3, 1948 |
| 2,455,765 | Harvey | Dec. 7, 1948 |